United States Patent [19]

Thompson

[11] Patent Number: 4,882,005

[45] Date of Patent: Nov. 21, 1989

[54] DEVICE FOR MAKING LAMINATED ARCH CORRUGATED STRUCTURES

[75] Inventor: Frederick H. Thompson, Marion, Ill.

[73] Assignee: Thompson Corrugated Systems, Inc., Marion, Ill.

[21] Appl. No.: 85,274

[22] Filed: Aug. 10, 1987

Related U.S. Application Data

[63] Continuation-in-part of Ser. No. 864,591, May 16, 1986, abandoned.

[51] Int. Cl.⁴ .............................................. B32B 31/12
[52] U.S. Cl. ..................... 156/470; 118/212; 118/259; 118/261; 118/694; 156/578
[58] Field of Search ........ 156/205, 206, 291, 470–473, 156/578, 462; 118/212, 261, 694, 259; 242/76; 29/122

[56] References Cited

U.S. PATENT DOCUMENTS

| | | | |
|---|---|---|---|
| 1,793,082 | 2/1931 | Goss | 118/212 |
| 2,769,324 | 11/1956 | Noe | 29/122 |
| 3,309,992 | 3/1967 | Motter | 118/261 |
| 3,548,781 | 12/1970 | Hornung | 118/212 |
| 3,695,221 | 10/1972 | Schaeuble | 118/261 |
| 3,762,365 | 10/1973 | Herzog | 118/261 |
| 3,999,038 | 12/1976 | Sikes et al. | 29/122 |
| 4,048,952 | 9/1977 | Peterson | 118/261 |
| 4,344,379 | 8/1982 | Roberts | 118/212 |

Primary Examiner—Merrell C. Cashion, Jr.
Attorney, Agent, or Firm—Haverstock, Garrett & Roberts

[57] ABSTRACT

An apparatus for making laminated dual and multiple arch corrugated structures including a first unit for making single-face corrugated members formed of a corrugated member and an attached liner and a second unit for combining one or more single-face corrugated structures into a double-face structure. The subject invention includes a novel mechanism for laminating one or more portions of the single-face or double-face corrugated structures and/or for impregnating one or more of the members of the such structures with an impregnating substance. The subject improvements also reside in a novel hold down roll construction to prevent wrinkling of the edge portions of web members used in the construction of corrugated panels.

19 Claims, 4 Drawing Sheets

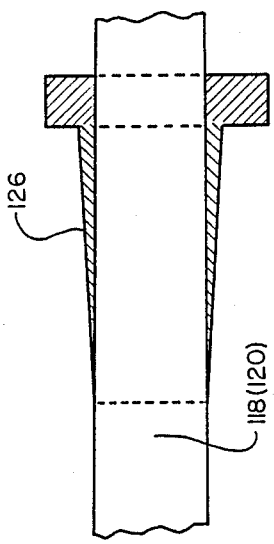
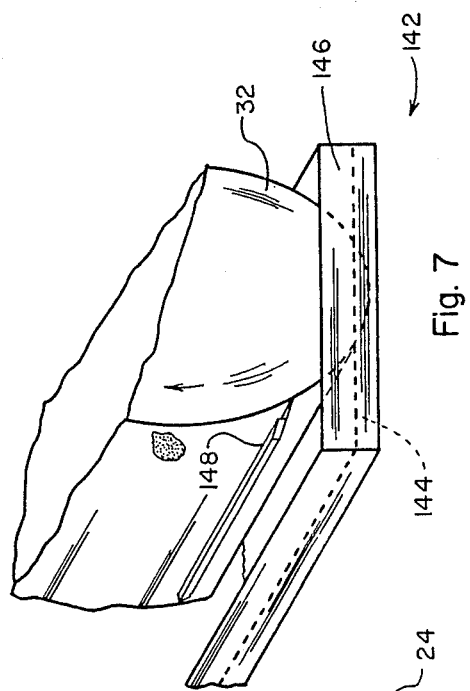
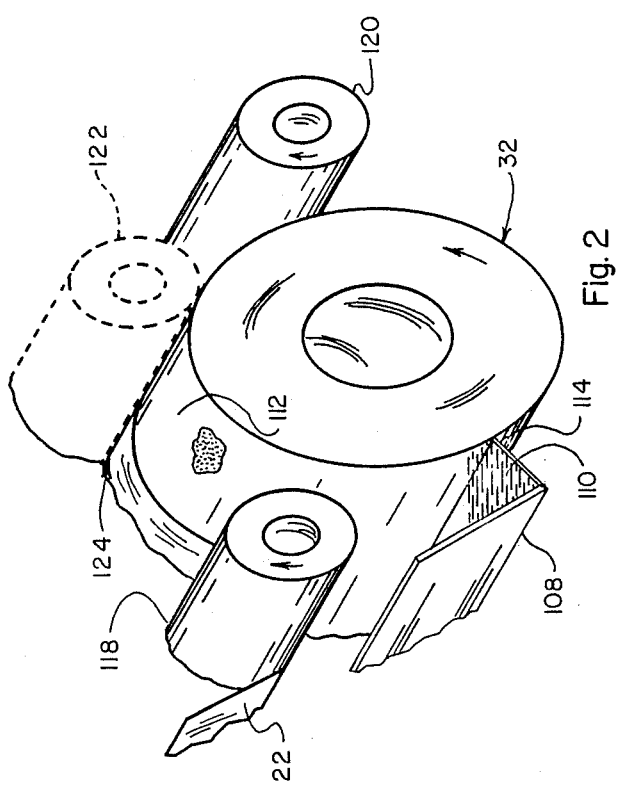
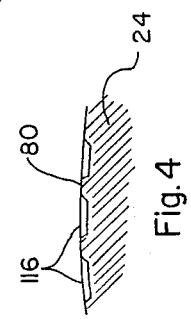
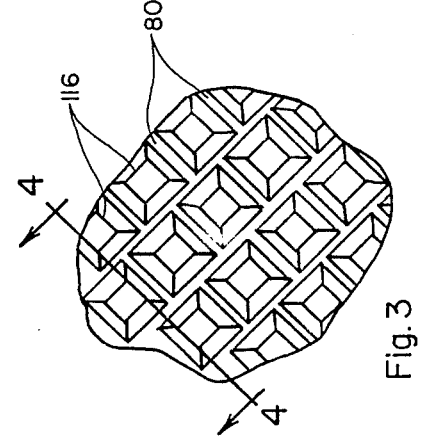

DEVICE FOR MAKING LAMINATED ARCH CORRUGATED STRUCTURES

This is a continuation-in-part of co-pending application Ser. No. 865,591 filed on May 16, 1986, now abandoned.

BACKGROUND OF THE INVENTION

Applicant is owner of co-pending U.S. patent application Ser. No. 724,097, filed April 17, 1985, and entitled IMPROVEMENTS TO CORRUGATING MACHINES, now abandoned.

The present invention relates generally to corrugating machines, and more specifically to improvements to units that adhesively laminate either mediums or liners prior to their connection together, apply coatings to either of these, and/or impregnate either or both with performance enhancing chemicals. This invention significantly improves the performance to cost of corrugated paper packaging, and has dramatic applications in packaging heavy items and fresh food products.

The unit referred herein includes means to meter the adhesives or coatings onto an intaglio roll surface which is then used to transfer or "print" such adhesive material onto a web surface, and includes mechanisms to maintain predetermined contact between such web surfaces and the surface of the intaglio roll. The invention can be used to laminate two or more mediums to be corrugated to produce what is commonly referred to as dual or multi-arch corrugated member, yet can also be used to laminate liners to each other for either strength enhancing or graphic results, or simply to apply surface coatings or impregnations for such purposes as moisture barriers, scuff resistance or web coloring, the use of which was either very difficult or impractical under prior art methods.

DESCRIPTION OF THE RELATED ART

There exists an increasing need for a corrugating machine capable of producing combined board having increased strength properties, as well as variable coating and/or impregnation capacities. These properties need to be applied to either the fluted medium, the flat liners, or both, and need to be capable of being applied when the individual rolls of materials are combined into the corrugated product. These needs must be fulfilled in a device that is consistent with the application rate, simplicity of operation, economy in production, as well as flexible for various applications of materials and flow rates. The subject improvements should also be compatible for incorporating into existing corrugating machines with minimal change and expense.

The typical corrugating process involves the fluting or corrugating of a web called a "medium", and attaching this fluted medium to a facer member or liner by a machine known as a single-facer. Such combined fluted and flat members can then be attached to another facer liner on the opposite side of the fluted peaks by a machine known as a double-facer. The in-line collection of such machines performs the entire process and is called a "corrugator". The majority of the vertical strength in the final product is the result of the fluted web. To increase strength it has heretofore been the practice to increase the basic weight, and therefore the thickness of the web material that is fluted. However, as the thickness increases, it becomes more difficult to accurately form the fluted curvatures because the medium tends to fracture on the outer radii at the flute bends and in direct proportion to the thickness of the medium. The more costly but heretofore most practical alternative to thicker mediums has been to increase the liner basic weight and/or to add additional fluted plys into what is known as "doublewall" or "triplewall" board. It has also been apparent in the industry that the ability to apply other chemicals at the corrugator which would enhance the original liner and medium properties would be beneficial, if a device could be developed that would have both practical operating capabilities as well as economic results.

Most existing coating devices use either a three-roll metering/applicator/hold down system in contact with the web medium, or a "squeegee" blade backing a fluid puddle onto the surface of the advancing web. Devices capable of producing a dual or double thickness medium have generally used either a very crude gravity flow of the adhesive stream or streams onto the lower of two advancing webs to be laminated or they have used a squeegee blade and puddle, or some other complex system such as those disclosed in U.S. Pat. Nos. 4,495,011 and 4,498,943. Prior to this invention it has not been practical to flute more than two plys of medium, hence the industry's terminology has been restricted to "dual" arch. As used herein, "dual arch" and any number of multiple plys are considered to be synonymous, and not restricted to simply two plys. Nor should any statements herein be considered as restricting the application of this invention to reverse the corrugation process, paper webs, or both.

All of the known previous devices have inherent difficulties in establishing and maintaining consistent and precise material application rates both across the web width and throughout the various machine speeds typical in the corrugating process. Additional operating difficulties occur with prior art means whenever a web splice, tear, or complete breakout happens, when webs of different absorbancy rates are used, or when the desired end product requires that materials be applied which have a relatively high viscosity (over 500 centipoises). Because of the physical damage to the web from mechanical stress created by applicator units such as those described by U.S. Pat. Nos. 4,495,011 and 4,498,943, dual or multiple arch production on single facers using either vacuum or air pressure means to retain the fluted medium against the lower corrugating roller has been impractical due to the tendency of the low viscosity adhesives used in the other systems to penetrate the web and contaminate the single-facer itself.

Finally, the existing adhesive applicator devices are not compatible with the operating needs for adhesively combining more than a single narrow web across a longitudinally wider base web, either as a dual arch medium or as a laminated liner. Such capacity is advantageous when the added strength is required on only a portion of the full web width, and when multiple units of this product are to be produced simultaneously across the width of the corrugator.

SUMMARY OF THE INVENTION

The present improvements to corrugating machines overcome many of the shortcomings and disadvantages associated with known laminators and/or coaters, and teach the construction and operation of relatively simple, effective and economical laminators and coaters. For example, the present device has means to wrap the liner and/or medium web against and over the respective applicator rollers thus allowing the applicator roller time to transfer the precise volumes of adhesive material, which were metered by the doctor blade precisely filling the depressions in the roller's surface, directly onto the respective liner or medium web. This process permits the use of relatively high solids/high viscosity adhesive materials that enhance the final corrugated product with superior bonding and coating properties. The volumes of adhesive materials to be transferred is controlled by the intaglio roll cell configuration including the arrangement and depth of the roll depressions. If these volumes are desired to be applied at different application rates for different end products, the device is constructed so that the intaglio roller can be easily and quickly exchanged.

It is preferable that the web receiving the adhesive impregnating or coating material be held against the intaglio applicator roller by tension within the web itself as it is pulled forward by the inherent resistance of the corrugating machine, and not by the incorporation of any pressure point or hold down roller and associated nip. Certain webs used in the corrugating process may have a tendency to curl away from the applicator roller at the edges. If this occurs, and a bowed wrap bar similar to that included at the entry portion of most single-facers is chosen not to be used, it has been found that this edge tension can be controlled by the strategic placement of low angle sleeves positioned on the wrap rollers. Such sleeves minutely increase the roller's diameter by a desired amount at the precise location of the edge curl and thereby eliminate any tendency for loose edges.

It is normally preferred that the applicator roller be driven at the same speed as the advancing web. However, under some uses it has been found to be advantageous to either "smear" the applied material onto the web by operating the applicator roller at a speed that is slightly slower than the advancing web, or "scrub" the applied material by driving the applicator roller somewhat faster than the advancing web. Adhesives and/or coatings can be applied to either the top surface or to the bottom surface of an advancing web. The location of the device herein described and the threading paths for the web will determine the surface on which the material is to be applied.

A principal object of the present invention is to provide means to produce improved coated or impregnated laminated liners and/or laminated corrugated board media.

Another object is to teach the construction and operation of machinery to produce corrugated board having greater strength, improved barriers to migratory elements such as moisture, grease and oils and improved stacking characteristics as compared to prior constructions.

Another object is to produce corrugated board having improved surface coating characteristics and therefore improved graphic appearance and physical characteristics.

Another object is to produce improved dual or multi-arch combined board by using two or more laminated mediums bonded together with adhesives having higher viscosity than has been practical with prior constructions.

Another object is to teach the construction and operation of machinery to produce corrugated board having more consistency in its coatings and in its laminations.

Another object is to teach the construction and operation of machinery to accomplish the above items, which machinery has improved economic and operating capabilities.

Another object is to teach improvements to corrugating machines that can be incorporated for use in existing machines or built into original equipment.

These and other objects and advantages of the present invention will become apparent after considering the following detailed description of a preferred embodiment in conjunction with the accompanying drawings, wherein:

DESCRIPTION OF THE DRAWINGS

FIG. 2 is a fragmentary perspective view of an applicator roller and associated means employed in the present improved construction;

FIG. 3 is an enlarged fragmentary view showing a portion of the surface of the applicator roller of FIG. 2;

FIG. 4 is a fragmentary cross-sectional view taken along line 4—4 of FIG. 3;

FIG. 5 is a fragmentary cross-sectional view showing a modified form of a web wrap roller;

DESCRIPTION OF THE PREFERRED EMBODIMENT

Figure 1A:
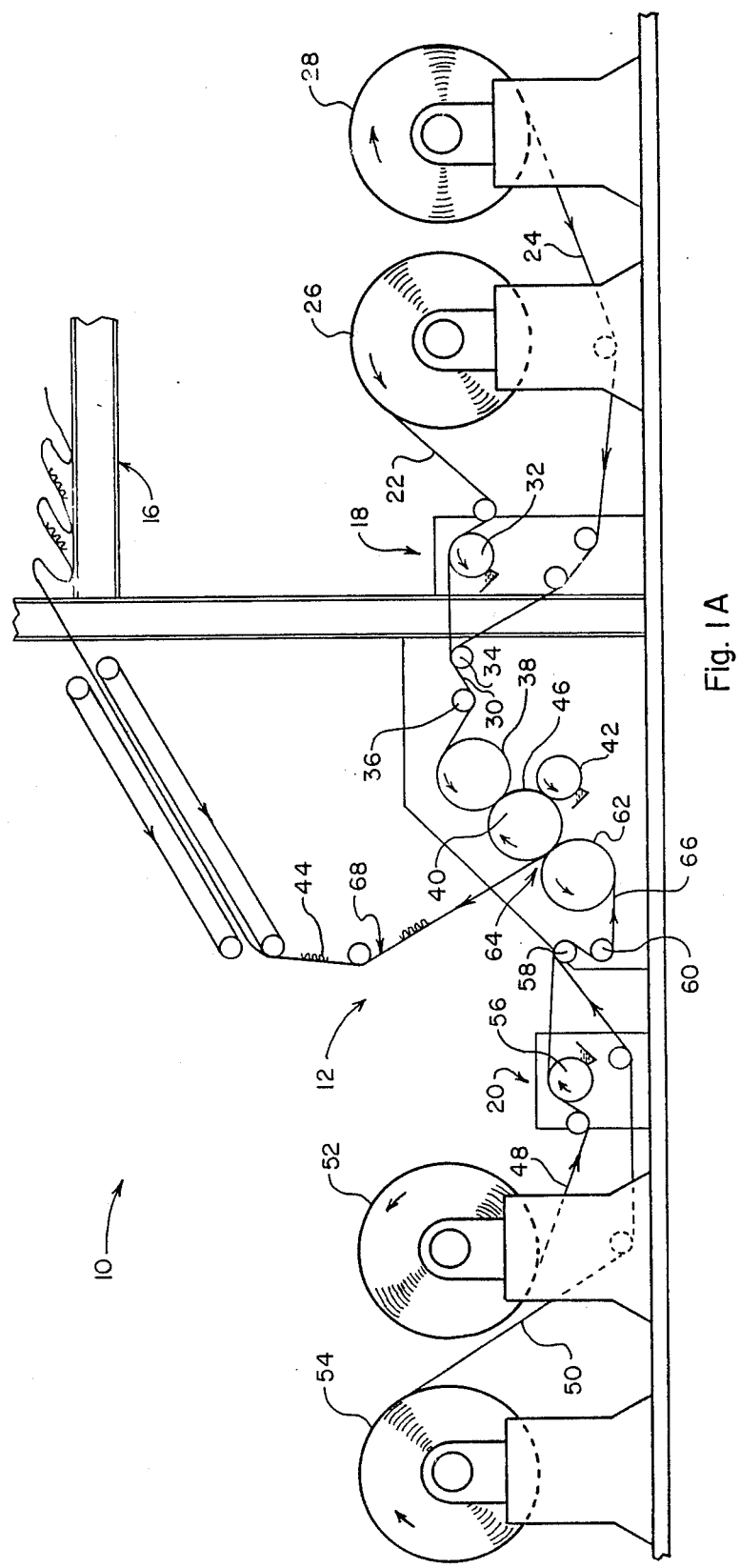
FIG. 1A is a side elevation of a single-facer unit of a corrugating machine embodying the teachings of the present improvements.
Figure 1B:
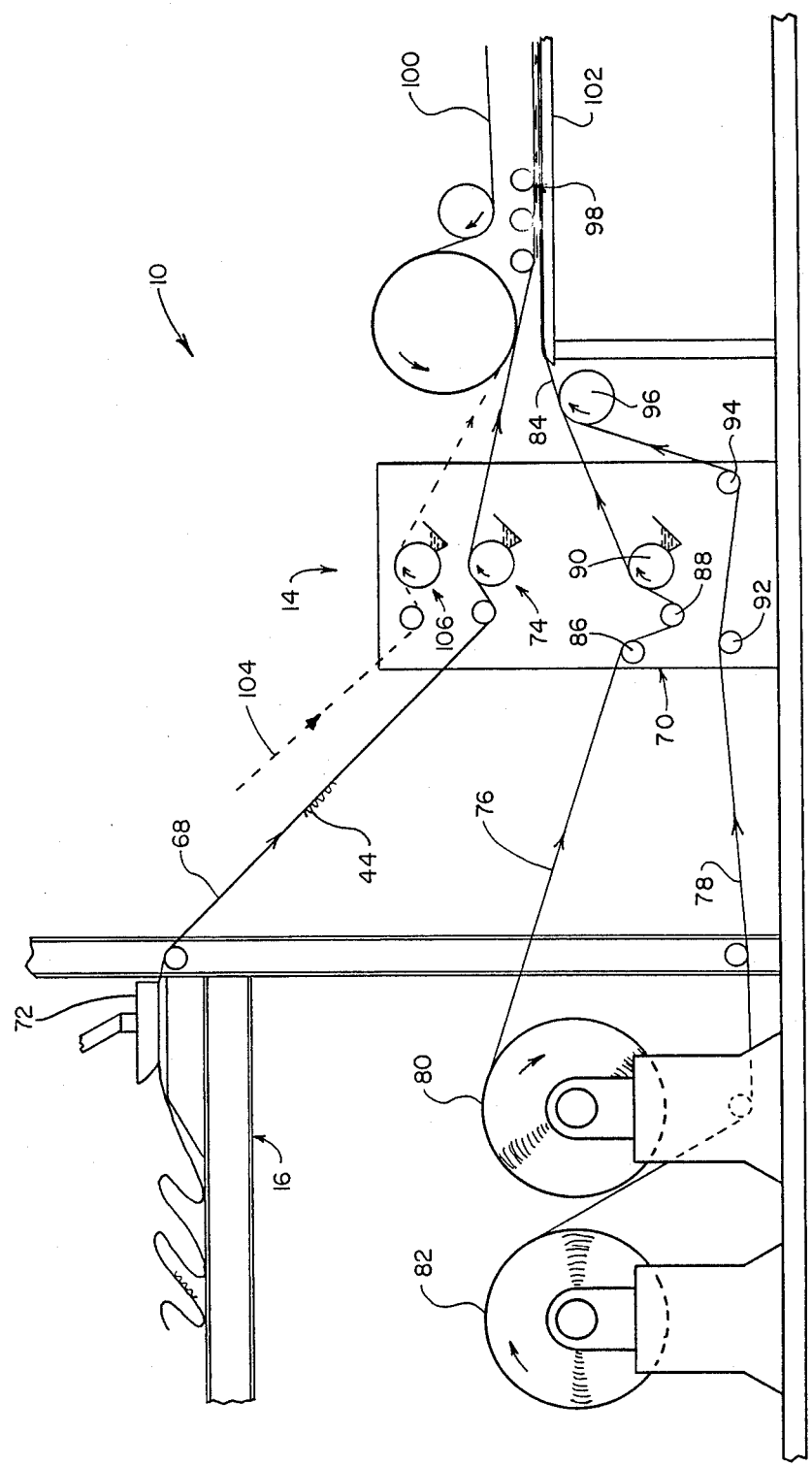
FIG. 1B is a side elevational view of a double-facer unit of a corrugating machine embodying other teachings of the present improvements.

Referring to the drawings more particularly by reference numbers wherein like numbers refer to like parts, number 10 refers to the entire assembly shown in FIGS. 1A and 1B which together constitute a machine for producing corrugated board. The corrugating machine 10 comprises at least one single-facer unit 12 (shown in FIG. 1A) and at least one double-facer unit 14 (shown in FIG. 1B). The single-facer unit 12 is connected by one or more bridges or single-facer accumulation means such as bridge 16 which receives the output of the single-facer unit 12 and accumulates it for feeding to the double-facer unit 14.

The single-facer unit as shown in FIG. 1A, includes two laminating units 18 and 20 as depicted, and either or both of such units may be employed, the precise locations of which may be varied within limits which is an advantage in that it substantially contributes to the flexibility and versatility of the machine. In the single-facer unit 12 two separate mediums 22 and 24 are fed from respective supply rolls 26 and 28 and are laminated together to form a double thickness medium 30 by passing the top web 22 circumferentially around a portion of an adhesive covered intaglio roller 32 shown in more detail in FIG. 2, and bringing the adhesively coated medium web 22 into contact with the second medium web 24 at a point such as that produced by roller 34. Thereafter the double thickness laminated medium 30 passes around attaching member or roller 36 and then is directed through and between cooperatively engaged first and second corrugating rollers 38 and 40. An adhesive applicator roller 42 is employed in the unit 12 to apply adhesive to the advancing flute tips 44 of the now laminated corrugating medium 46.

A liner is simultaneously formed by two liner web members 48 and 50 fed from separate source rolls 52 and 54. The webs 48 and 50 are laminated together by having one of the webs (web 48) exposed to an intaglio applicator roller 56 and thereafter coming into contact with the other web 50 as the two webs pass around portions of other rolls 58 and 60 positioned as shown. This brings the adhesively coated side of the web 48 into contact with the second liner web 50 and bonds them together as they are fed around the rolls 58 and 60 to form laminated liner member 66. The member 66 is then fed to and around a pressure roller 62 and through a nip 64 formed by and between the pressure roller 62 and the second corrugating roller 40. The two laminated web members 46 and 66 are brought into contact with each other as they move around and through the nip 64. In so doing, the laminated liner 66 will contact the flute tips of the corrugated web 46 and be adhesively bonded thereto to form single-face web 68. The single-face web 68 may be guided by means constructed as shown onto an accumulation device or platform such as the bridge 16 where it accumulates in an accordian-like manner and is drawn off therefrom adjacent to the opposite end of the bridge 16 to be fed over a series of other spaced rollers to be described later for feeding into the double-facer unit 14 shown in FIG. 1B.

In FIG.. 1B a laminating unit 70 is depicted and may be employed in tandem with units 18 and/or 20 in FIG. 1A or separately. The unit 70 may likewise be positioned in a variety of places as desired which adds to the versatility of the machine and makes it possible to install the subject improvements on existing corrugating machines as well as in new machines. The double facer machine 14 receives an input from the single-facer machine 12 by way of the accumulation on the bridge 16. A controlled drag producing means such as suction means 72 is provided adjacent to the bridge 16 as shown and engages the smooth or liner side of the single-face member 68 and operates to maintain controlled suction tension thereon as the web 68 is fed to the double-facer unit 14. In the double-facer unit 14, adhesive is applied to the flute peaks on the under side of the single-face web 68 which is the opposite side from the side that is attached to the liner 66. This occurs while the single-face web 68 is passing through an adhesive applicator unit 74. Also in the double-facer unit 14, second liner members 76 and 78 from respective source rolls 80 and 82 are brought together for laminating into a laminated web 84 by passing the upper web 76 around idler rollers 86 and 88 and then circumferentially around a portion of an adhesive coated intaglio applicator roller 90 included in the unit 70. The adhesively coated liner web 76 is then brought into contact with the second liner web 78 after the web 78 has moved around guide rollers 92 and 94 by passing the two engaged webs 76 and 78 around a portion of another roller 96. The two webs 76 and 78, which are now laminated into the web 84 and are thereafter brought into contact with and bonded to the flute tips of the single-face web 68 to complete the construction of the double-face corrugated web 98. The completed web 98 thereafter passes between means such as endless belt 100 and support member 102 which members cooperate to hold the parts of the double-face web 98 together for a sufficient period for the adhesives to bond. The various supply rolls used to supply the individual web members that form the liners and parts of the corrugated medium need to be resupplied from time-to-time as materials run out. This procedure is routine in all corrugating machines.

Additional similarly constructed single-facer units such as the unit 12 shown in FIG. 1A may optionally be provided and utilized within the same overall machine 10 to separately or simultaneously produce additional single-face webs for use in producing multiple layered corrugated structures in a double-facer similar to that shown in FIG. 1B for assembling single-face webs. Such a second single-face web 104 is shown in dotted outline in FIG. 1B and is accumulated on another bridge structure similar to the bridge 16. The second single-face web 104 is fed through another adhesive applicator unit 106 wherein the corrugation peaks of the web 104 have adhesive applied to them in the same manner as in the case of the web 68. Thereafter the web 104 is bonded to the liner side of the web 68 to produce a double-fluted corrugated panel. Additional single-facer units can also be included in the overall machine 10 depending on the desired construction of the output corrugated panel.

The adhesive units 18, 20, and 70 may be employed using either identical web widths that are the same across the width of the machine, or they can accommodate one or more webs that are less than the full width of the members being constructed and strategically placed as desired. The adhesive units 18, 20, and 70 are depicted as applying adhesive material to the lower surfaces of the upper web members that pass therethrough. However, the adhesive units may be installed with wrap rollers strategically positioned so as to bring the top surfaces of the lower webs into contact with the respective applicator rollers and thus apply adhesive material to the top surfaces of the lower webs instead of to the bottom surfaces of the upper webs. The adhesive units may also be constructed to impregnate or saturate the respective webs, as well as to apply surface coatings.

It is important that the present improvements can be built into new equipment as well as adapted to be installed in existing state of the art corrugating machines including those that employ either mechanical guide fingers to hold the medium against the lower corrugating rollers, as well as those that employ either vacuum or air pressure to hold the web in place against the lower corrugating rollers. The fact that the subject improvements can also be applied with minimal machine modifications to existing corrugators is an important advantage because it means that the subject improvements will be able to have broad acceptance in the corrugating industry with minimal labor and expense.

The applicator roller 32 (or 56) shown in FIG. 2 is positioned adjacent to a doctor blade/adhesive reservoir assembly 108 containing adhesive 110. In this way some of the adhesive 110, or other application material, is continuously being picked up by the intaglio surface 112 of the applicator roller 32 as the roller 32 rotates. The roller 32 is shown in FIG. 2 rotating in a counterclockwise direction, and the adhesive material 110 being picked up is preferably selected from among adhesives such as a vinyl-acetate ethlene, polyvinyl acetate, polyvinyl alcohol or other synthetic co-polymers, compounds or resins, although other types of materials may also be used. Coatings and impregnations when used may be selected from among the waxes, sealants, varnishes, colored tintings, urethanes, and any other materials that can be formulated so that sufficient viscosity and cohesive properties exist. The application devices are preferably located a sufficient distance away from the other portions of the corrugating machines so as to permit ease of operating as well as to insulate or substantially insulate the applicators from the relatively high temperatures normally used by many known corrugators.

A wiper or doctor blade 114, which may form one side of the reservoir assembly 108, is located to be in contact with the intaglio surface 112 of the applicator roller 32. The blade 114 is preferably biased into engagement with the roller surface 112 and the scraping edge of which is directed opposite to the direction of rotation of the applicator roller 32. The wiper or scraper blade 114 is included to provide means to remove by a positive scraping action excess adhesive or coating from the surface 112 of the applicator roller 32 as the roller turns, but without removing the adhesive material that has accumulated in the plurality of small surface depressions 116 which form the intaglio roller surface 112 (FIGS. 3 and 4). The form or shape, depth, and locations of the depressions 116 are important and will be more fully understood by reference FIGS. 3 and 4. The shape of the depressions 116 should preferably also be such that they do not have straight side edges parallel to the axis of the roller 32. This improves the metering and releasing action of the doctor blade 114 as it moves over the surface 112. The small amounts of adhesive material that remain in each of the depressions 116 after the surface has been scraped by the blade 114 is thereafter transferred as in a printing action from the roller surface 112 onto the surface of the medium or liner during the time that such members or portions thereof are held and maintained in contact with the surface 112. The maintaining of the liner or medium in contact with the roller 32 can be accomplished in various ways, including providing means such as tension producing wrap rollers 118 and 120 positioned as shown in FIG. 2. Also, in the embodiment shown in FIG. 2, contact occurs between the web 22 and the roller 32 over an arc of the roller 32 which is preferably from between about 40° to about 120°, although the exact amount of engagement is not critical and depends to some extent on certain parameters such as, on the roll speed, the properties of the adhesive material being applied, and the related dyne factors of the components. By incorporating wrap adjustment mechanisms such as provided by the rollers 118 and/or 120, a relatively wide arc of contact between the web member to which adhesive is to be applied and the applicator roll 32 can be achieved. The important thing is that the contact be of long enough duration for the adhesive to transfer from the depressions 116 to the web member, as a continuous pattern of dots. After leaving contact with applicator roller 32, the web is drawn forward until it contacts the web member to which it is to be attached and an adhesive bond is produced between them. If the subject machine is being used as a coater or impregnator, a second or unimpregnated web is not normally incorporated and the coated web is drawn into the corrugator in the normal manner.

In some applications it may be desired to install a "hold down" roller 122 (shown in dotted outline in FIG. 2) so that a nip 124 is formed between the applicator roller 32 and the hold down roller. This feature may also help to eliminate some web flutter. However, use of such a hold down roller generally has resulted in accumulation of small portions of the coating material on the hold down roller which is undesirable, and this feature also does not usually allow for very close tolerances between the hold down roller 122 and the applicator roller 32 to be maintained.

If web flutter especially adjacent to the edges of the web is a problem, it has been found that the use of strategically placed low angle sleeves such as the sleeve 126 shown in FIG. 5 can be installed on one or both opposite ends of the wrap rollers 118 or 120 to eliminate the flutter. Such sleeves 126, when used, usually are of minimal size and angle, and it is contemplated to form the wrap rollers themselves with enlarged end portions to accomplish the same result. The principal web tension producing means and the controls therefor may be of various known designs. The important thing is to bring one of the webs to be laminated into contact with the applicator roller surface such, as with the surface 112 in FIG. 2, and to the extent possible to prohibit web wrinkle as the web enters the corrugating machine proper.

Referring to FIG. 4, the cross-sectional shape of the several of the depressions 116 is shown. The depressions or indentations 116 can be formed by having the roller surface indented, etched, engraved or otherwise treated and the treatment should be uniform and should extend over as much of the surface 112 as possible. The shape and depth of the depressions 116 are designed for each different adhesive material to be applied, and is based on the idea that one volume or "dot" of adhesive material 110 is transferred to the web by contact of the webs for each distinct depression 116. The spacing and geometry of the depressions 116 is selected so that the resultant transfer of material onto the web is correct for the product to be manufactured. Also, the ability to be able to quickly and easily exchange applicator rollers, or build applicator devices with multiple applicator rollers is contemplated to accommodate different flow or transfer rates as needed.

In forming the multi-ply medium 46, a certain amount of machine-direction slippage will take place between the webs which form the medium as they pass into the flute formation means including the corrugating rolls 38 and 40. This machine direction slippage is usually an advantage as it serves to further spread the adhesive as well as to lubricate the webs which permits them to individually better conform to the flute peaks and valleys in the labyrinth of rollers 38 and 40.

Speed synchronization including electronically controlled variable speed drive motors and tracking sensors (not shown) may be used to control the surface speeds of the applicator rollers such as of the roller 32 to precisely match the speed of the web advancing into the corrugator machine. It has been found that most applied adhesive materials and webs will perform best when these speeds are identical. It is contemplated, however, that for certain applications the applicator rollers will be driven at speeds somewhat different than the speed of the advancing web in which case some slippage may be desired.

The webs constructed and combined into corrugated sheet or board using the improvements discussed herein have strength properties, barriers and/or graphic qualities that are far superior to those produced by the methods and machinery currently known and available.

Figure 6:
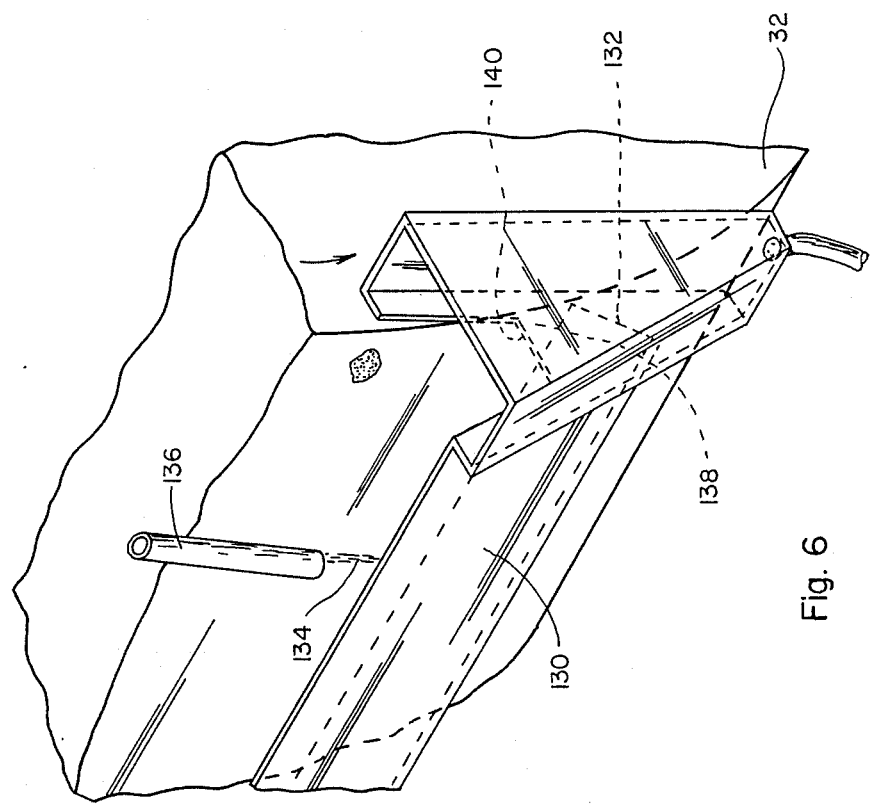
FIG. 6 is a fragmentary perspective view showing one possible material flow construction; and, FIG. 7 is a fragmentary perspective view showing an alternative embodiment of material flow for use in the present construction.

FIG. 6 shows another possible construction for an adhesive container and reservoir assembly 130. The assembly 130 includes a wiper blade 132 as a portion thereof, the edge of wiper blade 132 being inclined in a direction opposite to the direction of rotation of associated applicator roller 32 to positively engage and scrape the roller surface. The assembly 130 is located adjacent to one side, as distinguished from at the bottom of an applicator roller such as the roller 32, and the adhesive material 134 contained therein is fed to the container through an inlet conduit 136 such as depicted. A predetermined depth of adhesive is maintained in the assembly by means such as spaced end dams 138, the upper edges 140 of which control the depth of the adhesive.

FIG. 7 shows another embodiment of a device 142 for applying adhesive to the applicator rollers such as to the roller 32. In this case the roller 32 is partially submerged in a bath of adhesive 144 in container 146. The roller 32 is shown rotating in a clockwise direction, and a doctor blade 148 is resiliently and positively engaged with the roller surface to remove by scraping adhesive material in excess of that which is contained in the depressions 116. The doctor blade 148 may be formed as part of the side wall of the container 146. All of the adhesive material 144 so removed drains back into the container 146 where it can be re-used.

Thus there has been shown and described novel, non-obvious, improvements to corrugating machines used for producing single-face, double-face, and multiple ply corrugated panels or boards that have laminated members in them, including improvements at the single-facer and at the double-facer units which fulfill all of the objects and advantages sought therefor. It will be apparent to those skilled in the art, however, after a review of this description that many changes, modifications, variations and other uses and applications for the subject constructions, in addition to those which have been disclosed, are possible and contemplated, and all such changes, modifications, variations and other uses and applications which do not depart from the spirit and scope of the invention are deemed to be covered by the invention which is limited only by the claims which follow.

What is claimed is:

1. Apparatus for making corrugated panel structures having a laminated corrugated web formed by at least two connected together web members having peaks and valleys, and a facer member attached to the corrugation peaks on one side thereof, comprising:
    a supply of separate web materials to be laminated and corrugated to form a corrugation medium and a supply of a web facer member to be attached to the corrugation peaks on one side of the corrugation medium;
    a first applicator roller having a cylindrical surface formed by a plurality of spaced surface depressions distributed uniformly thereover, means to apply an adhesive substance in liquid from when applied to the surface of the first applicator roller including a container positioned adjacent to one side of the first applicator roller in position to directly expose a portion of the cylindrical surface thereof to the adhesive substance in the container whereby adhesive is transferred from the container to the first applicator roller to cover the cylindrical surface and fill the uniformly distributed surface depressions therein;
    means to rotate the applicator roller;
    said container being closed at both ends and along both sides and including means to limit the depth of adhesive that can be in said container so that the area of the applicator roller that is exposed to the adhesive in the container remains substantially constant and so that an excess of adhesive can be fed into the container without substantial change in the adhesive depth therein;
    means forming a scraping edge on said container biased into engagement with and in opposition to the direction of rotation of the cylindrical surface of the applicator roller to positively bear against said surface substantially uniformly along the length thereof during rotation thereof to positively and uniformly scrape said surface and remove therefrom excessive adhesive substance except for the adhesive substance contained in the surface depressions, which scraped and removed adhesive remains in said container;
    means to maintain a portion of one of the web members to form the corrugation medium engaged with the cylindrical surface of said applicator roller over a predetermined arcuate portion thereof and for a time period sufficient to permit transfer of the adhesive substance remaining in the depressions while in liquid form to the one web member;
    means to bring the separate web members together with the adhesive substance therebetween to form a laminated medium therefrom;
    means including a pair of cooperatively engaged corrugating rollers forming a corrugation nip therebetween;
    means for feeding the laminated medium before the adhesive is fully cured into the nip between the corrugating rollers to corrugate the medium and form peaks and valleys therein;
    means including a second applicator roller positioned adjacent to one of the corrugating rollers for applying an adhesive substance to the corrugation ridges on one side of the corrugated medium;
    a pressure roller positioned adjacent to said one corrugating roller to form a nip therewith;
    means to bring the web facer member into contact with the corrugation peaks of the corrugated medium to unite the facer material and the corrugated medium to form a single face corrugated member.

2. The apparatus of claim 1 wherein the supply of web facer members includes at least two supply rolls of web facer materials, a third applicator roller for applying an adhesive substance to the web facer material from one of said supply rolls, said third applicator roller having a cylindrical surface defined by a plurality of surface depressions distributed uniformly thereover;
    means to apply an adhesive substance to the cylindrical surface of the third applicator roller including a container positioned adjacent to one side of the third applicator roller in position to directly expose a substantially constant area of the surface thereof to the adhesive substance contained in the container, said container being closed at both ends and both sides and including means to maintain a predetermined depth of adhesive in the container whereby a uniform amount of the adhesive substance is continuously transferred from the container to the third applicator roller to cover the surface thereof and fill the surface depressions therein;
    means forming a scraping edge on said container biased into engagement with an in opposition to the direction of rotation of the surface of the third applicator roller to positively bear against said surface substantially uniformly along the length thereof and to positively and uniformly scrape and remove adhesive substance from the surface thereof except for the adhesive substance remaining in the depressions, which scraped and removed adhesive substance remains in said container;

means to effect contact between the web facer material from the one supply roll and the cylindrical surface of the third applicator roller over a predetermined arcuate portion thereof to allow time for the adhesive substance contained in the depressions to transfer in liquid form from the surface of the third applicator roller as a pattern of uniformly distributed distinct dots to the web facer material; and, means to produce a laminated facer member by bringing the web facer member from the two supply rolls of web facer material together to produce a bond therebetween.

3. The apparatus of claim 1 wherein the adhesive substance is the container in a high solids, high viscosity adhesive having a viscosity greater than 500 cps.

4. The apparatus of claim 1, including a hold down roller positioned adjacent to the first applicator roller to hold the one web member against the first applicator roller at the location thereof.

5. The apparatus of claim 1 including means to maintain the one web member relatively uniformly engaged with the first applicator roller across the width thereof, said means including at least one idler roller positioned in spaced relation to the first applicator roller, said idler roller having annular tapered enlarged members adjacent to the ends thereof which increase the diameter thereof where the edge portions of the web engage the idler roller.

6. The apparatus of claim 1 including at least one idler roller positioned in spaced relation to one side of the first applicator roller in position to engage the one web member and to maintain the one member engaged with the first applicator roller over a predetermined arcuate portion of the cylindrical surface thereof.

7. The apparatus of claim 1 including means to synchronize the speed of rotation of the second applicator roller to the speed of movement of the medium so that the medium does not move relative to the surface of the second applicator roller while engaged therewith.

8. Apparatus for making corrugated structures wherein at least one portion is formed by a laminated member comprising a source of a single-face web including a corrugated member formed with spaced ridges and valleys and a liner member attached to the ridges of the corrugated member on one side thereof;

an applicator roller having a cylindrical surface formed by a plurality of space depressions distributed relatively uniformly over the surface thereof;

means to rotate the applicator roller;

a source of liquid adhesive material including a container therefor mounted adjacent to one side of the applicator roller in position so that the adhesive material in the container is directly exposed to a portion of the applicator roller whereby some of said adhesive material adheres to the applicator roller as the roller rotates, said container being closed at both ends and both sides and including means to limit the depth of the adhesive material therein whereby the surface area of the applicator roller exposed directly to adhesive material does not exceed a predetermined surface area;

scraper means formed on said container having a scraping edge biased into engagement with and positioned in opposition to the direction of rotation of the cylindrical surface of the applicator roller so as to press against said surface substantially uniformly along the length thereof and positively and uniformly scrape the roller surface and remove the adhesive material therefrom except for the adhesive materials contained in the depressions, which scraped and removed adhesive material remains in said container;

means for feeding the single-face web such that the corrugation ridges on the second side thereof move into engagement with a portion of the cylindrical surface of the applicator roller including guide roll means spaced apart from said applicator roller to maintain the corrugation ridges engaged with the applicator roller over a predetermined arcuate portion of the cylindrical surface whereby the adhesive material contained in the depression has time to transfer as a plurality of uniformly distributed distinct dots thereon from the depressions to the corrugation ridges engaged therewith;

means to produce a liner member for attaching to the corrugation ridges on the single-face web including first and second sources of liner webs;

a second applicator roller having a cylindrical surface thereon defined by spaced depressions distributed relatively uniformly over the surface thereof;

a supply of a second adhesive material including a container therefor positioned adjacent to one side of the second application roller whereby a portion of the cylindrical surface thereof is directly maintained in contact with the second adhesive material and picks up such material as the second applicator roller states;

said container being closed at both ends and both sides and including means to limit the depth of adhesive material that can be in said container;

second scraper means formed on said container having a scraping edge biased into engagement with and positioned to positively bear against said surface of said second applicator roller substantially uniformly along the length thereof and in opposition to the direction of rotation of the surface of the second applicator roller to remove by positively and uniformly scraping excess of said second adhesive material therefrom except for the second adhesive material that fills the spaced depressions which scraped excess adhesive material remains in said container;

means to feed one side of said first liner web into engagement with the cylindrical surface of the second applicator roller including means to maintain engagement between said first liner over a predetermined arcuate portion thereof in a range from about 40 degrees to about 120 degrees of the second applicator roller, the tension of the web against the second applicator roller being sufficient to allow the adhesive in the depressions time to transfer to the first liner web;

means to bring the first and second liner webs into contact with each other to form a laminated liner member;

means to bring the laminater liner member into engagement with the corrugation ridges on the second side of the single-face web; and, means to maintain the laminated liner engaged with the single-face web to allow the adhesive materials applied to the members to cure.

9. The apparatus of claim 8 including a second source of single-face web, separate means including a third applicator roller engageable by the corrugation ridges on the second single-face web for applying adhesive material thereto, guide roll means spaced apart from the application roller for maintaining the corrugation ridges engaged with the surface of the applicator roller over a predetermined arcuate portion thereof whereby adhesive material in liquid form is transferred to the corrugation ridges, and means for bringing the corrugation ridges on the second single-face web into engagement with the liner on the one side of the aforesaid single-face web to form a structure which combines the two single-face webs into a unitary corrugated structure.

10. In an apparatus for producing corrugated structures from separate elongated web members having spaced opposite edges the improvement comprising means for applying adhesive material to a surface of one of the web members comprising
an applicator roller having a cylindrical surface formed by a plurality of distinct surface depressions distributed uniformly thereover,
means for rotating the applicator roller;
a container containing a supply of a adhesive material positioned adjacent to one side of the cylindrical surface of the applicator roller in position to directly expose a portion of the surface of the applicator roller to the adhesive material container therein;
said container being closed at both ends and both sides and including means to limit the depth of adhesive material that can be contained in said container to maintain the area of the applicator roller exposed to adhesive material in the container substantially constant;
a scraper member having a scraping edge formed on said container biased into positive engagement in opposition to the direction of rotation of the cylindrical surface of the applicator roller to bear against the surface thereof substantially uniformly along the length thereof to uniformly scrape off adhesive material therefrom in excess of the adhesive material contained in the surface depressions such that said scraped adhesive material remains in said container;
guide means spaced apart from the applicator roller to guide one of the separate elongated web members during feeding thereof into contact with the cylindrical surface of the applicator roller, said guide mans including means for maintaining a predetermined length of the one web member engaged under the tension in said one web member with the applicator roller over a predetermined arcuate portion of the surface thereof whereby each portion of the one web member is engaged with the applicator roller during movement thereof for a time that is sufficient for the adhesive material in the uniformly distributed depressions to transfer to the one web member as a uniform pattern of distinct dots, and
means on said guide mans to prevent wrinkling of said one web member adjacent to the edges thereof as it moves in contact with the applicator roller.

11. In the apparatus of claim 10 wherein the guide means includes at least one guide roll member positioned in spaced relation to the application roller, the means on the guide means to prevent wrinkling including at least one separate removable low angle sleeve providing a gradual increase in the diameter of the guide roll member adjacent to the corresponding end thereof.

12. In the apparatus of claim 10 wherein the guide means includes a pair of spaced guide roll members located in spaced relation to the applicator roller substantially on opposite sides thereof, at least one of said guide roll members having at least one separate removable low angle sleeve providing a gradual increase in diameter adjacent to the corresponding end thereof.

13. In the apparatus of claim 12 further including a pressure roller positioned adjacent to the applicator roller to form a nip therewith, the one web member extending through the nip between the applicator roller and the pressure roller.

14. In the apparatus of claim 8 wherein the adhesive material applied by said applicator roller is an adhesive selected from vinyl-acetate ethylene, polyvinyl acetate, polyvinyl alcohol and other like synthetic copolymer, compound or a resin in a liquid vehicle thereof.

15. The apparatus of claim 8 wherein the corrugated member of the single-face web is a laminated member.

16. The apparatus of claim 8 wherein the liner member of the single-face web is a laminated member.

17. Apparatus for making corrugated members having laminated mediums and a facer member attached to at least one opposite surface thereof comprising at least three separate sources of web material, means to separately feed material from each of the sources, a supply of cold set adhesive material in liquid form, an applicator roller for applying said adhesive material from siad supply to one surface of one of the web members having a cylindrical intaglio surface formed by a plurality of spaces surface depressions distributed uniformly thereover, means mounting said applicator roller for rotation in a direction corresponding to the direction of feed of said one web member, means including a container for the adhesive material mounted adjacent to one side of the applicator roller for applying the adhesive material directly to the intaglio surface of the applicator roller, said container being closed at both ends and both sides and including means in the container to maintain a predetermined depth of adhesive therein and to thereby maintain the area of the applicator roller exposed thereto relatively constant, scraper means having a scraping edge formed on said container and positioned to rest against and positively engage the intaglio surface of the applicator roller and in a direction such that rotation of the applicator roller causes the scraping edge to uniformly press against the surface of the applicator roller along the length thereof to remove excess adhesive therefrom except for the adhesive that remains in the surface depressions formed in the intaglio surface, means to maintain the one web member engaged against the intaglio surface of the applicator roller over a predetermined arcuate portion thereof from between about 40° and about 120° thereof during feeding to allow time for transfer of adhesive from the depressions in the intaglio surface to the one web member, means for moving the surface of the one web member to which adhesive is transferred into engagement with the surface of another of the web members from a different source to bond the web members together, corrugating means and means for moving the bonded web members therethrough to form corrugation ridges and valleys therein before the adhesive is fully cured, means including a second applicator roller having a cylindrical intaglio surface, container means to apply adhesive directly thereto, second scraper means having a scraping edge positioned to rest against and positively engage the intaglio surface in a direction such that rotation of the applicator roller causes the scraping edge to press uniformly against the intaglio surface along the length thereof to uniformly remove excess adhesive therefrom, said second applicator roller means applying adhesive to the corrugation ridges on one side of the bonded corrugated member, and means for bringing the web member from the third source into engagement with the corrugating ridges to adhesively bond the third web member thereto to form the facer member thereon.

18. The apparatus of claim 17 wherein the adhesive is a high solids, high viscosity adhesive having a viscosity greater than 500 cps.

19. The apparatus of claim 17 including means to synchronize the speed of rotation of the second applicator roller to the speed of movement of the bonded web members so that the corrugated web member does not move relative to the surface of the second applicator roller when engaged therewith.

* * * * *

UNITED STATES PATENT AND TRADEMARK OFFICE
CERTIFICATE OF CORRECTION

PATENT NO. : 4,882,005
DATED : November 21, 1989
INVENTOR(S) : Frederick H. Thompson It is certified that error appears in the above-identified patent and that said Letters Patent is hereby corrected as shown below:

Column 5, line 29, delete "."

Column 11, line 38 after "one" insert --web--.

Column 12, line 37 delete "states" and insert --rotates--.

Column 12, line 66, delete "laminater" and isert --laminated--.

Column 13, line 64 delete "mans" and insert --means--.

Column 14, line 34, "siad" should be --said--.

Column 14, line 37, "spaces" should be --spaced--.

Signed and Sealed this

Fourth Day of December, 1990

Attest:

HARRY F. MANBECK, JR.

*Attesting Officer*  *Commissioner of Patents and Trademarks*